June 6, 1939.   F. G. LOGAN   2,161,179
ELECTRIC CONTROLLING APPARATUS
Filed Aug. 21, 1936

INVENTOR
FRANK G. LOGAN
BY
Lawrence K. Sager
his ATTORNEY

Patented June 6, 1939

2,161,179

UNITED STATES PATENT OFFICE 2,161,179

ELECTRIC CONTROLLING APPARATUS

Frank G. Logan, Pelham, N. Y., assignor to Ward Leonard Electric Company, a corporation of New York Application August 21, 1936, Serial No. 97,127

7 Claims. (Cl. 171—119)

This invention relates to electric controlling apparatus and particularly to an improved method and means for regulating the voltage of an alternating current dynamo-electric machine, such as a generator. It also relates to the self-excitation of the dynamo-electric machine and to auxiliary mains for initially building up the voltage of the generator. It also relates to automatic means for controlling the proper sequence of operations in building up the voltage of the generator and then causing it to be self-exciting.

One feature of the invention is based upon the utilization of a harmonic of an alternating current system and particularly of a special characteristic of the change in the value of the voltage of such a harmonic in response to change of voltage of the dynamo; for example, in transformers supplied from a three-phase system, a third harmonic is induced which, with a proper connection and relationship of windings, may be conveniently and commercially utilized for securing desired controlling effects.

One object of the invention is to provide an improved method and means for regulating the voltage of a dynamo-electric machine efficiently and dependably. Another object is to provide regulation within close limits of control by utilization of responsive apparatus which is sensitive to small changes and capable of producing a comparatively large corrective factor. Another object is to provide improved auxiliary means for exciting the field winding of the dynamo electric alternating current machine during the building up of its voltage and to then render the machine self-exciting and to accomplish this by comparatively simple and inexpensive form of apparatus. Another object is to accomplish these results in a proper sequence of control automatically in a dependable manner. Other objects and advantages of the invention will be understood from the following description and accompanying drawing.

Figure 1:
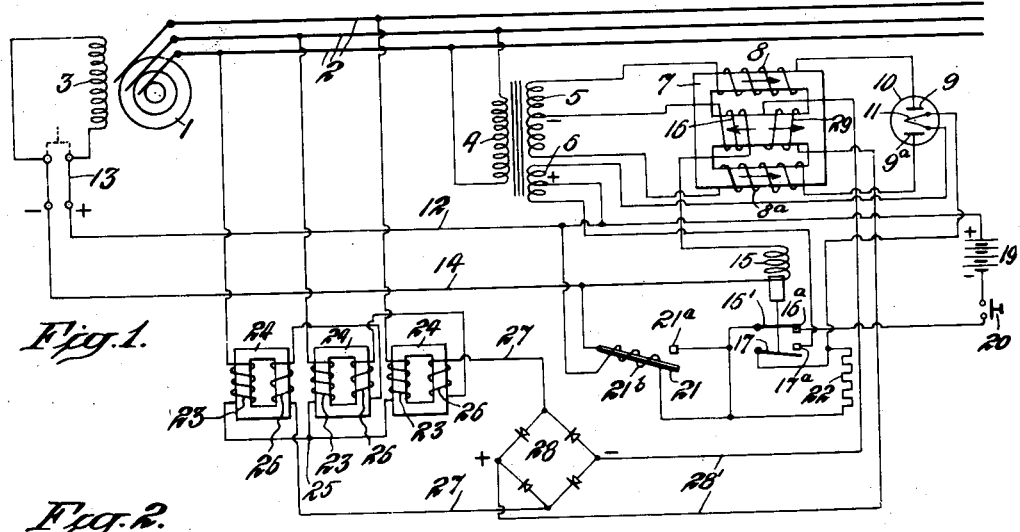
Figure 2:
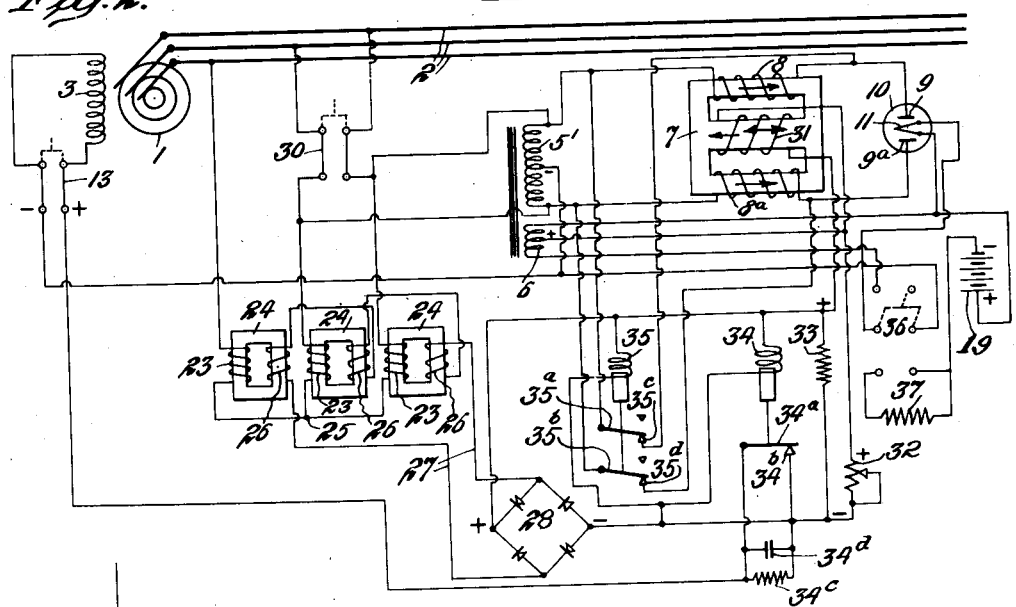
Figure 3:
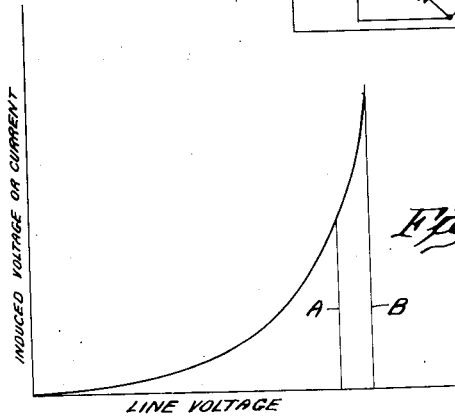

Fig. 1 is a diagram illustrating one embodiment of the invention; Fig. 2 is a diagram illustrating another embodiment, and Fig. 3 is an explanatory chart.

Referring to Fig. 1 a three-phase dynamo electric machine or generator 1 is indicated supplying the mains 2. The generator is provided with a field winding 3 which is excited by direct current. A transformer is shown having a primary winding 4 connected across one phase of the generator mains and having secondary windings 5 and 6. A reactor core 7 of the three-legged type is indicated, although this may be of any suitable form and may, if desired, be sub-divided into separate cores. On the upper leg of the core is indicated an anode winding 8 connected between one terminal of the secondary 5 and an anode 9 of a full wave rectifier 10. On the lower leg of the core is indicated an anode winding 8a connected between the other terminal of the secondary 5 and the anode 9a of the rectifier. The cathode 11 of the rectifier is supplied with heating current from the secondary winding 6 during running conditions, the cathode being then connected to the terminals of the secondary winding 6. From the mid-point of this secondary a connection is made to the positive conductor 12 connected to the field winding 3 through a field switch 13. The other terminal of the field winding is connected through switch 13 to the negative conductor 14 which is connected to a relay winding 15, from which the circuit continues through a winding 16 on the middle leg of the reactor core; and from this winding the circuit is completed by connection to the mid-point of the secondary winding 5. The relay coil 15 controls a switch having movable contacts 16' and 17. When the coil 15 is deenergized, the contact 16' engages its fixed contact 16a, the contact 17 being then out of engagement with its contact 17a. When the coil 15 is sufficiently energized it raises the contacts 16' and 17 causing contact 16' to break its engagement with contact 16a and the contact 17 to engage its contact 17a.

A battery 19, or any other suitable source of direct current, has its positive terminal connected to the conductor 12 and its negative terminal connected through a normally open pushbutton switch 20 to the contact 16a of the relay. A switch which is adapted to close upon being heated to a certain temperature is composed of a movable bi-metallic element 21 adapted to engage a fixed contact 21a. A heating coil 21b envelops the bi-metallic element 21 and has one terminal connected to the conductor 12 and its other terminal connected to the movable contact 16 of the relay. The fixed contact 21a is also connected to the movable contact 16'. The resistance 22 is connected in series with the cathode 11 of the rectifier during the initial starting conditions by having one of its terminals connected to the contact 16' and its other terminal connected to one terminal of the cathode 11. This terminal of the cathode is also connected to the movable contact 17 of the relay. The fixed contact 17a is connected to one terminal of the secondary winding 6.

Across the three-phase mains of the generator 1 is connected in proper sequence and direction of turns, as shown, the primary windings 23 of three single phase transformers having cores 24. These windings are connected to a common point 25 forming a star connection of the primaries. The secondary windings 26 are connected in proper sequence and direction of turns, as indicated in the drawing, to form a delta connection which is open by the leads 27. These leads are connected to the terminals of a suitable rectifier 28'. The particular form of rectifier indicated is a bridge-connected rectifier of copper oxide units, but may be of other form according to particular requirements. The leads 28' receiving direct current from this rectifier, are connected to the terminals of a control winding 29 on the middle leg of the reactor core 7.

The three single phase transformers with the primary windings 23 connected in star and the secondary windings 26 connected in delta, with the rectifier 28 included in the delta circuit, induce in the delta connected circuit certain harmonics of which the third harmonic is particularly pronounced. The induced voltage or current of the third harmonic varies widely according to the degree of magnetization of the single phase cores 24. Under a low exciting current, this induced voltage or current is very small; and as the magnetization of the cores increases, the induced voltage rises comparatively slowly. As the cores 24 approach and reach saturation, the third harmonic induced voltage or current rises rapidly. This condition is illustrated in Fig. 3 wherein the abscissae indicate the change of line voltage or exciting current in the primary windings 23 and the ordinates indicate the induced voltage or current of the third harmonic in the closed circuit of the delta connected secondaries. As shown in Fig. 3 the induced voltage or current is comparatively small during considerable increase of the line voltage; and it is not until the cores approach saturation that the induced third harmonic voltage becomes of considerable magnitude. It then rises rapidly with comparatively small increase in line voltage, giving an area between the lines A and B of Fig. 3 wherein there is a very pronounced change of the induced voltage or current under a comparatively small change of line voltage. This condition occurs at or near the knee of the magnetization curve of the iron of the cores 24. This critical response of the third harmonic to a comparatively small change of line voltage, is applied to secure close regulation of the voltage of the dynamo-electric machine 1, as will be understood from the following explanation of the mode of operation.

With the parts in the positions shown in Fig. 1 and assuming that the generator 1 is driven by any suitable means, the operation is initiated by the operator pressing the pushbutton 20 and holding it closed for a short interval. This closes a circuit for heating the cathode 11 of the rectifier which circuit may be traced from the positive terminal of the source 19 to the mid-point of the secondary 6 and then through the upper portion of this secondary to one terminal of the cathode 11, then through the cathode and then through resistance 22 to the movable element 16' of the relay and then through switch 20 to the negative terminal of the battery. The resistance 22 serves to limit the heating current through the cathode to a proper amount. The closing of the pushbutton 20 also completes a circuit from the positive terminal of the battery through the heating coil 21b and through the contact 16' and pushbutton 20 to the negative terminal of the battery.

After a proper interval, the heating of the bimetallic strip 21 causes it to engage contact 21a which closes a circuit through the field winding 3 of the generator by a circuit from the positive terminal of the battery through the field winding 3 to the conductor 14, thence through the switch 21 to contact 21a and then through the contact 16' and through switch 20 to the negative terminal of the battery. This causes the voltage of the generator to gradually build up toward normal amount and in the meantime the cathode of the rectifier has been heated in preparation for the proper functioning of the rectifier. When the generator has built up to sufficient voltage to cause the rectifier to become active, the relay coil 15 is energized, moving the contact 16' from its fixed contact and moving the contact 17 into engagement with its fixed contact. The circuit through the coil 15 for causing this action is from the terminals of the secondary winding 5 alternately through the anode windings 8, 8a to the cathode of the rectifier and from the mid-point of the secondary 6 through the field winding 3 and then through the relay coil 15 and coil 16 of the reactor back to the mid-point of the secondary 5. The apparatus then functions as a self-exciting alternating current dynamo-electric machine, the field winding being energized by current from the rectifier 10 through the circuit just traced, except that the upper terminal of cathode 11 is connected directly to the lower terminal of the secondary winding 6 through contact 17 of the relay; and the cathode is then heated by current derived from the machine 1 instead of from the battery. The operator may then release pushbutton 20. The opening of contact 16' causes the heating coil 21b and resistance 22 to be disconnected from the negative pole of the battery. The resultant cooling of the thermal switch 21 will therefore cause this switch to open soon after the relay coil 15 has become energized, thus placing this heating switch in open position for another starting operation and thus insure proper sequence of control, as above described, in any subsequent starting of the apparatus.

During the building up of the field of the generator, the exciting current in the primary windings 23 of the single phase transformers has gradually increased and caused the delta connected windings 26 to create a third harmonic voltage which is applied to the bridge-connected rectifier 28. This voltage, as already explained with reference to Fig. 3, is comparatively small until the cores 24 of the transformers approach saturation. These transformers are designed to cause their cores to be operated at or near the knee of the magnetization curve when the voltage of the generator is normal. This results in a very marked change in the magnitude of the third harmonic induced voltage or current upon comparatively small change of generator voltage from normal, as already explained.

The anode windings 8 and 8a have such a direction of turns on the reactor core as to cause their flux to pass through the winding 16 and the control winding 29 in one direction. In the particular example shown, the flux due to the anode windings is indicated as passing through the outer legs of the core 7 from left to right which results in this flux passing from right to left through the middle leg of the core, as shown by the left-hand arrow on the middle leg. The direction of turns of the coil 16 is such as to cause the flux due to this winding to act cumulatively with the flux due to the anode windings, as likewise indicated by the left-hand arrow on the middle leg of the core. The direction of turns of the control winding 29 is such as to cause the flux due to this winding to oppose the flux due to the anode windings, as indicated by the right-hand arrow on the middle leg of the reactor core.

The ampere turns of the anode windings and of the series winding 16 are such that in the absence of any opposing flux due to winding 29, the reactor core would be saturated and the rectifier would deliver a current to the generator field winding higher than the normal amount and tend to cause the generator 1 to have a voltage higher than normal. However the current in the control winding 29 causes same reduction in the flux of the core and thereby reduces the reactance of the anode windings and results in the field winding of the generator receiving a current that will cause the generator to deliver its normal voltage.

The regulating action of the control winding 29 will cause the generator to maintain its normal voltage within close limits. If the generator voltage should rise above normal value, the increase in the induced third harmonic current will be quite pronounced and cause a pronounced increase in the current of the control winding 29. The increased bucking effect of its flux will reduce the resultant flux in the anode windings of the reactor and thereby increase their reactance and reduce the current supplied to the field winding of the generator. This of course brings the generator voltage down to its normal value. Upon decrease of the generator voltage below normal, the marked decrease in the current induced in the control winding 29 causes an increase in the resultant flux through the anode windings which reduces their reactance and permits an increased current to be supplied to the field winding of the generator to raise its voltage. Thus the regulating action due to the pronounced change of the induced third harmonic current is utilized in the control of the flux through the anode windings of the reactor to maintain a substantially constant generator voltage.

In Fig. 2 parts which correspond to those of Fig. 1 are similarly numbered. In Fig. 2 the transformer supplying energy to the rectifier is indicated as an autotransformer, the winding 5' thereof being connected across a pair of supply mains 2 through a manually operated switch 30, which also controls the supply of current to the primaries 23 of the transformers which supply the third harmonic current to the bridge rectifying unit 28. The anode windings 8 and 8a of the reactor are connected as in Fig. 1 and are wound to cause the flux created thereby to pass in a common direction in the middle core of the reactor, indicated by the left-hand arrow on the middle leg. The winding 16 on the middle leg of this reactor in Fig. 1 is omitted in Fig. 2; and the control winding 31 in Fig. 2 instead of being subjected to current in one direction only, is subjected to current in one direction or in the other, according to conditions, as indicated by the double arrow shown at the right of the middle leg of the reactor. One terminal of the winding 31 is connected to the positive center tap of the transformer winding 6 and is also connected through an adjustable resistance 32 to the negative terminal of the bridge rectifier 28. The other terminal of the control winding 31 is connected to the positive terminal of the rectifier 28 and the resistance 33 is connected between the positive and negative terminals of the rectifier 28.

In view of two terminals of the resistances 32 and 33 being both connected to the negative terminal of the rectifier 28 and in view of the control winding 31 being connected between the remaining two terminals of the resistances 32 and 33, it is evident that a current will flow through the control winding 31 in one direction if the voltage across the resistance 33 is higher than that across the resistance 32, which current will be proportional to the difference in voltages. If, however, the voltage across resistance 32 is higher than that across the resistance 33, current will flow in the winding 31 in the opposite direction and will have a value depending upon the difference between these voltages. This form of the invention by which reversible current is utilized in the control winding 31 has the advantage over that shown in Fig. 1 of requiring only one control winding on the middle leg of the reactor. Also, by adjustment of either of the resistances 32 or 33, any desired compounding can be obtained due to the non-linearity of the third harmonic current derived from the transformers supplying the rectifier 28. In the drawing the resistance 32 is shown adjustable.

Owing to the fact that a sudden decrease of a heavy load on the generator 1 might permit an undesirable rise in the voltage of the generator owing to the time constant of the control circuit, an over-voltage protective relay is provided having a control winding 34 which is connected across the positive and negative terminals of the rectifier 28. The over-voltage relay has a movable contact 34a normally engaging a fixed contact 34b. These contacts normally short circuit a resistance 34c, a condenser 34d being connected between the contacts of the relay for reducing the arcing when the contacts are opened. The resistance 34c is connected so that upon the opening of the relay, it will be inserted in series in the circuit of the field winding 3 and thus reduce the over-voltage of the generator 1 and upon reclosure of the relay permit the normal control to be resumed.

An under-voltage relay is also provided to offset the effect of any sudden large increase in load on the generator, as the time response of this type of regulator is comparatively slow. The controlling coil 35 of the under-voltage relay is connected across the positive and negative terminals of the bridge rectifier 28 and is thus responsive to change of the generator voltage. The movable contacts 35a and 35b of the relay are respectively connected to terminals of the anode windings 8 and 8a, while the fixed contacts 35c and 35d are respectively connected to the remaining terminals of these anode windings. Under normal operating conditions the relay coil 35 is sufficiently energized to hold the movable contacts against their fixed stops and be out of engagement with the contacts 35c and 35d. If a sudden increase in load on the generator is so marked that its voltage drops abnormally low before the regulator has time to overcome the drop, then the voltage applied to the relay coil 35 is insufficient to retain the movable contacts and they are permitted to engage the fixed contacts 35c and 35d. This obviously short circuits the anode windings 8 and 8a and permits the full voltage from the transformer winding 5' to be applied to the rectifier to supply increased current to the field winding 3. As soon as the regulator has regained control to bring the generator voltage to normal, the relay coil 35 moves the movable contacts out of engagement with the fixed contacts and again places the anode windings in circuit and permits normal control to be resumed.

In Fig. 2 a double throw switch 36 is provided for initiating the operation of the apparatus and the circuit connections will be understood from the following description of operation.

Assuming the parts in the position shown in Fig. 2, the switches 13 and 30 being closed, the switch 36 is first thrown to its lower position. This connects the auxiliary source of direct current 19 to the fielding winding 3 of the generator by a circuit from the positive terminal of the source 19 through the upper portion of the transformer winding 6 and then from its middle tap through resistance 32 to fixed contact 34b of the over-voltage relay, then through the movable contact 34a of the relay to the positive terminal of the field winding 3; and the return circuit from the field winding is completed through the right-hand member of the switch 36 and thence from the lower right-hand fixed contact of the switch to the negative terminal of the battery. This energization of the generator field winding causes the generator voltage to be built up gradually. The throwing of the switch 36 to its lower position also completes a circuit through the filament 11 from the source 19 for the purpose of heating this filament in preparation for normal operation. This circuit is from the positive terminal of the source 19 to one terminal of the filament 11 and then through this filament to the left-hand blade of the switch 36 and then from the lower left-hand fixed contact of this switch through a resistance 37 to the negative terminal of the source 19. The resistance 37 is for the purpose of limiting the heating current through the filament to a proper value.

After a proper time interval, the switch 36 is moved to its upper position which causes the apparatus to assume normal operating conditions. The closure of the switch 36 in its upper position connects the lower terminal of the transformer winding 6 with the upper terminal of the filament 11, thus causing the heating current to be supplied from the winding 6. The under-voltage relay 35 will be energized sufficiently to raise its movable contacts and thus place the anode windings 8 and 8a in circuit for normal operation and the control apparatus serves to supply rectified current to the field winding of the generator. The circuit from the transformer winding 5' through the field winding may be traced from the outer terminals of the winding 5' alternately through the anode windings 8, 8a to the anodes 9, 9a of the rectifier and th :.ce through the cathode 11 through the heating winding 6 to its mid-point and then through resistance 32 through the contacts of the over-voltage relay 34 to the positive terminal of the field winding 3 and then from this winding to the mid tap of the transformer winding 5'. It will be seen from the circuit connections that upon the occurrence of an over-voltage, the resistance 34c will be inserted in this field circuit for reducing the generator voltage to a desired amount whereupon the over-voltage relay will close and short-circuit the resistance 34c and permit the control apparatus to function normally.

Now as regards the regulating action, the transformers supplying the third harmonic current will act in response to change of voltage of the generator to give pronounced changes in the harmonic current upon comparatively small changes in the generator voltage in the manner already explained. The resistance 33 is responsive to this change of voltage because it is connected across the positive and negative terminals of the bridge rectifier 28, the output voltage of which corresponds to the value, or change of values, of the third harmonic voltage or current. As already explained, the resistance 32 is subjected to the field current and the drop in volts across this resistance is responsive to changes in the value of the field current. Let it be assumed that the drop in volts across the resistance 33 is the same as the drop in volts across the resistance 32 under a certain condition of operation. In that event the control winding 31 will have no potential difference across its terminals as regards the resistances 32 and 33 because the terminals of these resistances to which the winding 31 is connected, have the same potential. Now assume that the generator voltage rises slightly. This will cause a considerable increase in the third harmonic current and in the voltage applied to the resistance 33, causing the positive terminal of this resistance to have a higher potential than that of the positive terminal of resistance 32. This causes a current to flow in the winding 31 in such a direction as to oppose the flux due to the anode windings 8, 8a. This reduction of flux in the core 7 increases the reactance of the anode windings resulting in a less voltage being applied to the anodes of the rectifier 10 and a reduction of the current supplied to the field winding and thereby reduces the generator voltage to normal. Now assume that the generator voltage decreases slightly below normal resulting in a decreased voltage being applied to the resistance 33. The potential of the positive terminal of this resistance will then be less than that of the positive terminal of the resistance 32 resulting in the passage of current through the winding 31 in the opposite direction from that previously considered. The flux due to the winding 31 will then be in a cumulative direction with reference to the flux due to the anode windings of the reactor and cause a resultant increase in the magnetization of the reactor core. This of course reduces the reactance of the anode windings and causes an increased voltage to be applied to the anodes of the rectifier 10 and thereby increases the current supplied to the generator field winding to raise the voltage to normal. Thus the control winding 31 is enabled to impose upon the reactor a wide range of control to compensate for any departure from normal generator voltage within extreme limits and the extent of the corrective factor depends upon the departure from normal to give close regulation of the generator voltage. Although in the above example, a normal condition of no current was assumed to exist, it will be understood that normal voltage conditions may require a current in one direction or in the other in the control winding 31, according to the proportioning and adjustments of the apparatus. By adjustment of the values of the resistances 32 or 33, any desired compounding effect may be obtained, as previously explained.

Although I have described particular embodiments of this invention, it will be understood that various applications and modifications thereof may be made without departing from the scope of the invention. Instead of using three single phase transformers for creating the third harmonic control current, a three-phase transformer of the shell type may be utilized. Also the form of the controlling reactor may be other than that indicated in the drawing and may in same cases be sub-divided into two reactors with the anode windings and control windings properly related thereon. Likewise any suitable type of rectifiers may be used and instead of using a full wave rectifier 10 as indicated in the drawing, single wave rectifiers may be used if desired, as will be understood by those skilled in the art.

I claim:

1. The combination of a polyphase alternating current machine having a field winding, a rectifier supplied with energy derived from said machine for supplying current to said field winding, an auxiliary source of direct current for supplying current to said field winding to initially build up the voltage of said machine, a switch for supplying heating current to said rectifier from said source, a time delay switch controlled by said first named switch for supplying current to said field winding from said auxiliary source, and means for automatically disconnecting said auxiliary source from said field winding and from said rectifier and for supplying heating current to said rectifier from said machine upon the voltage of said machine attaining a certain value.

2. The combination of a polyphase alternating current machine having a field winding, a rectifier supplied with energy derived from said machine for supplying current to said field winding, an auxiliary source of direct current for supplying current to said field winding to initially build up the voltage of said machine, a switch for supplying heating current to said rectifier from said source, a time delay switch controlled by said first named switch for supplying current to said field winding from said auxiliary source, and a relay in the circuit of said rectifier for automatically disconnecting said auxiliary source from said field winding and from said rectifier and for supplying heating current to said rectifier from said machine upon the functioning of the rectifier to supply current to said field winding.

3. The combination of a polyphase alternating current dynamo-electric machine, transforming means connected to said machine having a core normally magnetized in the region of the knee of the magnetization curve and having its secondary windings connected in series with each other for creating a current which is a harmonic of the frequency of said machine, a rectifier supplied with energy derived from said machine for supplying current to the field winding of said machine, a reactor having a winding in series with said rectifier, and a winding on said reactor controlled by said means for causing its flux to oppose or aid that of said series winding according to change in voltage of said machine.

4. The combination of a polyphase alternating current dynamo-electric machine, transforming means connected to said machine having a core normally magnetized in the region of the knee of the magnetization curve and having its secondary windings connected in series with each other for creating a current which is a harmonic of the frequency of said machine, a rectifier supplied with energy derived from said machine for supplying current to the field winding of said machine, a reactor having a winding in series with said rectifier, and a winding on said reactor subjected to the difference in potential between two points, the potential of one of said points being responsive to change of said harmonic current and the potential of the other of said points being dependent upon change of current through said field winding.

5. The combination of a polyphase alternating current dynamo-electric machine, transforming means connected to said machine having a core normally magnetized in the region of the knee of the magnetization curve and having its secondary windings connected in series with each other for creating a current which is a harmonic of the frequency of said machine, a rectifier supplied with energy derived from said machine for supplying current to the field winding of said machine, a reactor having a winding in series with said rectifier, a rectifier responsive to changes of said harmonic current, an impedance device subjected to the change of voltage of said last named rectifier, an impedance device in series in the circuit of said field winding, and a control winding on said reactor responsive to the difference in voltages across said impedances.

6. The combination of a polyphase alternating current dynamo-electric machine, transforming means connected to said machine having a core normally magnetized in the region of the knee of the magnetization curve and having its secondary windings connected in series with each other for creating a current which is a third harmonic of the frequency of said machine, a rectifier supplied with energy derived from said machine for supplying current to the field winding of said machine, a reactor having a core and having a winding thereon in series with said rectifier, and a winding on a portion of the core of said reactor in the main path of the flux of said series winding and controlled by said means and related to cause its flux to oppose that of said series winding.

7. The combination of a polyphase alternating current dynamo-electric machine, transforming means connected to said machine having a core normally magnetized in the region of the knee of the magnetization curve and having its secondary windings connected in series with each other for creating a current which is a third harmonic of the frequency of said machine, a rectifier supplied with energy derived from said machine for supplying current to the field winding of said machine, a reactor having a core and having a winding thereon in series with said rectifier, a second winding on a portion of the core of said reactor in the main path of the flux of said series winding and controlled by said means and related to cause its flux to oppose that of said series winding, and a third winding on said reactor acting cumulatively with said series winding and connected in series with the field winding of said machine.

FRANK G. LOGAN.